(12) United States Patent
Grant

(10) Patent No.: US 12,495,481 B2
(45) Date of Patent: Dec. 9, 2025

(54) REMOTE LIGHT SWITCH

(71) Applicant: Burt Grant, Mesa, AZ (US)

(72) Inventor: Burt Grant, Mesa, AZ (US)

( * ) Notice: Subject to any disclaimer, the term of this patent is extended or adjusted under 35 U.S.C. 154(b) by 255 days.

(21) Appl. No.: 18/382,559

(22) Filed: Oct. 23, 2023

(65) Prior Publication Data
US 2024/0138043 A1    Apr. 25, 2024
US 2024/0237178 A9    Jul. 11, 2024

Related U.S. Application Data

(60) Provisional application No. 63/418,142, filed on Oct. 21, 2022.

(51) Int. Cl.
*H05B 47/19*    (2020.01)
*B60Q 1/00*    (2006.01)

(52) U.S. Cl.
CPC ........... *H05B 47/19* (2020.01); *B60Q 1/0076* (2013.01)

(58) Field of Classification Search
CPC ......... H04W 4/80; H04W 84/12; H04W 4/50; H04W 4/70; H04W 76/10; H04W 76/14; H04W 88/02; H04W 88/06; H04W 4/00; H04W 12/50; H04W 12/03; H04W 4/40; H04W 12/06; H04W 12/10; H04W 4/021; H04W 4/60; H04W 80/06; H04W 4/029; H04W 12/088; H04W 12/12
See application file for complete search history.

(56) References Cited

U.S. PATENT DOCUMENTS

2010/0280677 A1 *    11/2010    Budike, Jr. ............ H05B 47/19
                                                                    700/90

* cited by examiner

*Primary Examiner* — Monica C King
(74) *Attorney, Agent, or Firm* — Accelerate IP LLC

(57) ABSTRACT

A remote light switch system for mobile structures is disclosed. The system includes a power harness, an enclosure with a connector for engaging a light harness, and a control with a wireless module, a switch, and a controller. The control allows a user to selectively activate the electrical connection to the light features on the mobile structure. The system also includes an antenna attached to the enclosure and connected to the control. The system can be wirelessly controlled via a remote control, smartphone, tablet, or laptop. The enclosure can be attached to the mobile structure using a trailer attachment. The system can be used with various types of mobile structures and power sources.

15 Claims, 3 Drawing Sheets

REMOTE LIGHT SWITCH

This application claims benefit from current U.S. Provisional Application No. 63/418,142 titled "Remote Light Switch System" and having a filing date of Oct. 21, 2022, and all of which is incorporated by reference herein.

FIELD OF THE INVENTION

The present specification relates generally to devices for turning on a light and more specifically for such devices that turn on a trailer's light remotely.

BACKGROUND OF THE INVENTION

It is common in the art for remote light switches to turn on and off lights in a house, cabin, office space or other structure. These remote light switches are typical connected to the user's wireless internet and can allow the user to control the lights remotely from around the world as long as the user is connected to the internet. These types of devices are commonly referred to as Internet of Things ("IoT") device because they require the user and the device to be connected to the internet. The benefit of these types of light switches is that it allows the user to set timers, remotely control the light, and receive the status of the light. However, if the internet is disconnected the user is not able to operate the light. This is problematic in remote areas where internet connection to the device or the user's portable computing device is not possible. These remote areas are usually where people take their recreational vehicles to camp and enjoy the outdoors.

When in these remote locations people will hike, hunt, fish, or ride their vehicles miles away from where the recreational vehicle is parked and commonly these types of people will return to their camp after dark and usually need to fumble around to get lights on around camp. It is also common that people cannot locate their camp if dark out until they are close to see their vehicles. Current solutions include using user's headlamps, or lights from a vehicle to locate and then turn on the lights around camp. Using headlamps or light from a vehicle is limited in that it only provides a certain amount of light and does not help the user locate their camp.

Therefore, there is a need for a remote light system that allows the user to turn on the lights of their recreational vehicle without the use of the internet.

BRIEF SUMMARY OF THE INVENTION

Accordingly, the present invention comprises provides a remote light switch system for selectively operating light features on a mobile structure. The system includes a power harness to connect to the power source, an enclosure with at least one open side, a connector in the enclosure that engages the light harness, and a control in the enclosure comprising a wireless module, a switch, and a controller. The control allows a user to selectively activate the electrical connection, and an antenna attached to the enclosure is connected to the control.

In another embodiment, the remote light switch system further includes a cover that selectively covers the hole in the enclosure. The connector can be a 7-pin, 3-pin or 4-pin female socket for a trailer or a recreational vehicle. The wireless module can be wirelessly coupled to a remote control, which can be a wireless remote, smartphone, tablet, or laptop. In yet another embodiment, the enclosure further includes a first trailer attachment that is attached to the enclosure and can be removably attached to a second trailer attachment. The second trailer attachment can be a clamp to be clamped around a trailer frame.

The wireless model can be an infrared signal, radio frequency signal, or Wi-Fi signal, and the controller can be a micro-controller. In a further embodiment, the antenna can be flexible, telescopic, or integrated within the enclosure. The connector can be a first connector and a second connector. The mobile structure can be a recreational vehicle, fifth wheel, camper trailer, or flatbed trailer. The power source can be a battery on the trailer or a power source in the enclosure, which can be a flooded lead acid battery, lithium-ion battery, silver calcium battery, gel cell battery, or nickel metal hydride.

It is an advantage of the current invention to allow the user to use the trailers lights as extra lights within their campsite.

It is an advantage of the current invention to allow the user to remotely turn on lights at camp without the need for internet by use of a remote.

It is an advantage of the current invention to provide the user with the location of their camp by the user of the lights on their trailer at push of a button.

It is an advantage of the current invention to provide the user with a device that will allow the user to protect their trailer plug by keeping the trailer plug off of the ground and connected which helps protect the plugs from the elements.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the. Absent such clear statements of intent to apply a "special" definition, it is the inventor's intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for" and will also recite the word "function" (i.e., will state "means for performing the function of . . . , without also reciting in such phrases any structure, material or act in support of the function. Thus, even when the claims recite a "means for performing the function of molding a . . . , step for performing the function of molding a . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Trailers and recreational vehicles commonly have a series of brake and running lights that serve safety and visibility functions including running lights, brake lights, turn signals, hazard lights, fog lights, license plate lights, awning lights, safety lights, undercarriage lights, bike rack or cargo carrier lights, step lights, docking lights, and utility lights. To enable these functions, the towing vehicle and the trailer are connected through an electrical harness that transmits signals for the various lighting functions. Typically, a 4-pin or 7-pin connector is used, depending on the trailer's size and the number of features it supports. Each light or series of lights will have an electrical connection, and the lights illuminate when power is provided to the connection and turn off when no power is provided to the connection.

Figure 1:
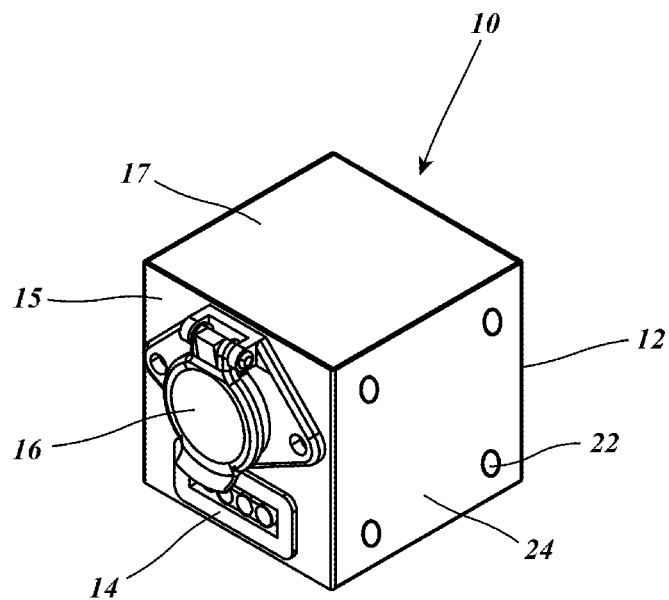
FIG. 1 is an isometric view of the remote light switch system in accordance to one, or more embodiments.
Figure 2:
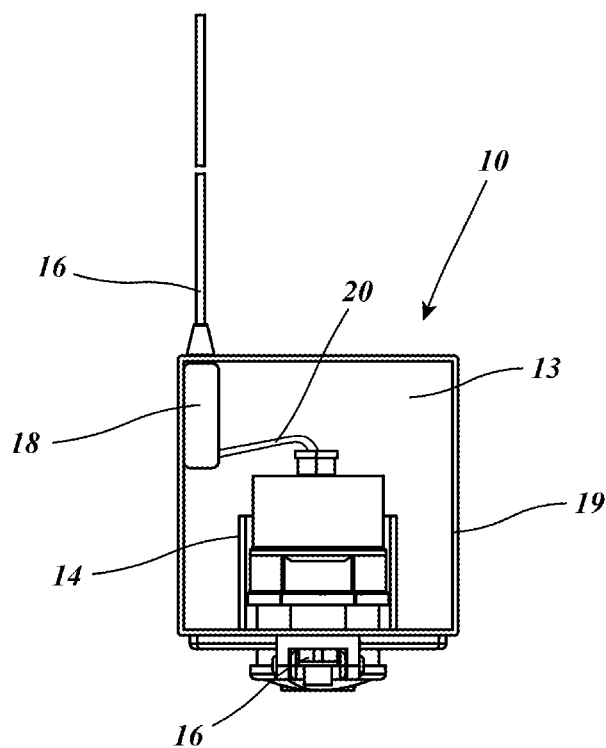
FIG. 2 is a top view of the remote light switch system in accordance to one, or more embodiments.
Figure 3:
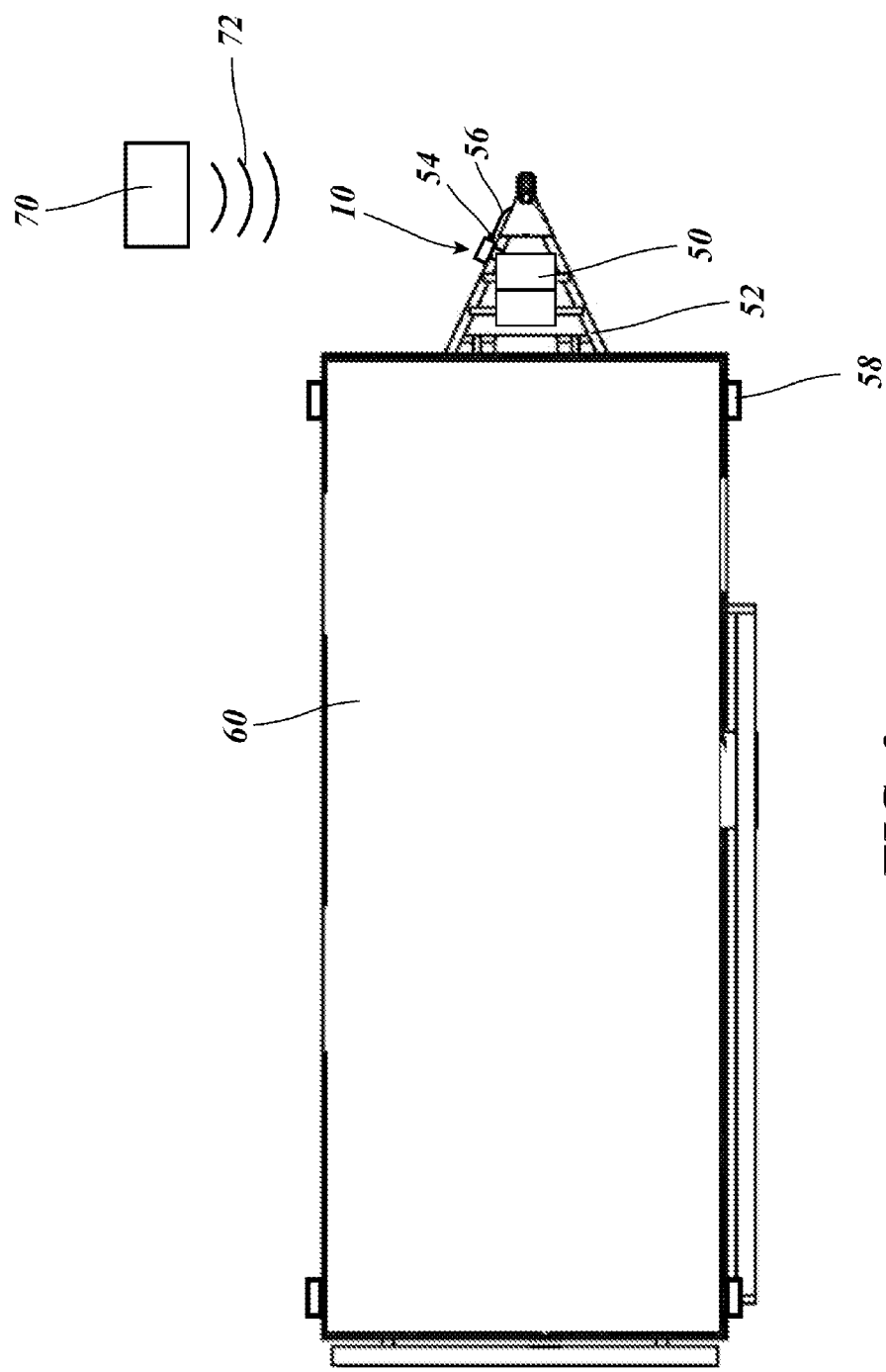
FIG. 3 is a top view of the remote light switch system in accordance to one, or more embodiments.
Figure 4:
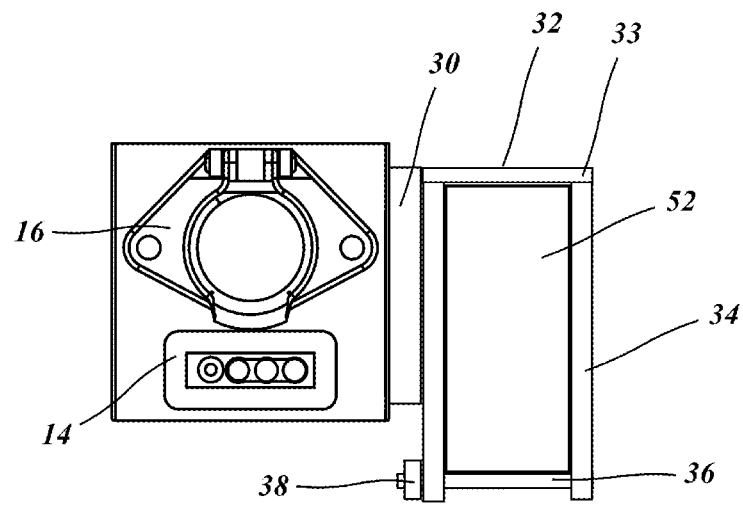
FIG. 4 is a bottom view of the remote light switch system in accordance to one, or more embodiments.
Figure 5:
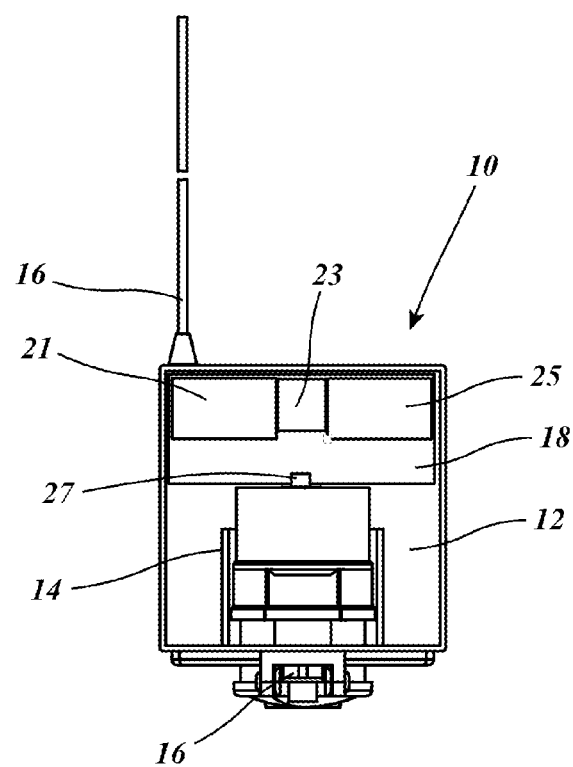
FIG. 5 is a side, top and cross-sectional view of the remote light switch system in accordance to one, or more embodiments.

Referring initially to FIGS. 1-5, a remote light switch 10 for selectively operating light features on a mobile structure having a power source 50 and a light harness 54 that has at least one electrical connection for at least one light on the mobile structure, the switch can comprise a power harness to connect to the power source.

A connector, which can be a first connector 14 and/or a second connector 16, in the enclosure that engages the light harness 54 to allow selective electrical flow from the power source 50 to the at least one electrical connection. A controller 25 can be in the enclosure 12 comprising a wireless module 21, a switch 23 and the controller wherein the controller allows a user to selectively activate the at least one electrical connection. An antenna 16 attached to the enclosure and connected to the control. In the preferred embodiment there can be a first connector 14 and a second connector 16 wherein the first connector and the second connector can be attached to the enclosure by such as, for example, fasteners, rivets, adhesive, or the like.

The enclosure 12 can be any suitable size or shape such as, for example, rectangular, square, circular, hexagonal or the like and can have an inner chamber 13. The enclosure 12 can be sealed on at least one side to keep fluids out of the inner chamber 13 by such as, for example, gasket, O-ring or the like. The enclosure 12 can be manufactured from such as, for example, stainless steel, aluminum, carbon steel, plastics, or any other material type suitable for outdoor use. The enclosure 12 having at least one open side 19 wherein a first side 15 can have at least one hole (not shown) sized to fit at least one light harness 54 and/or the first connector 14 and the second connector 16.

The first connector 14 and/or the second connector 16 can be selectively attached to another accessory when the first or second connector is connected to the trailer can add extra light such as, for example, powering a string of lights that are separate from the trailer's lighting allowing the user to add additional lighting onto the trailer such as, for example, led lights, rope lighting, wire rope lighting, lantern lighting, wireless lighting or the like. In other embodiments, the connector 12, 16 can flash the trailer's lights 58 that are coupled to the connector through an intermittent switch, flasher relay, or the like, or a horn wherein the user can selectively choose between steady lights, flashing lights, horn, or the like. The user can selectively choose the mode the lights are in by a remote 70 wherein the remote can be such as, for example, a key fob, wireless remote, portable computing device, smart phone or the like.

In embodiments, the first connector 14 and/or second connector 16 can both be compatible with the power source 50 wherein the trailer's battery can power the lights on the trailer and the lights on the other connector. In certain embodiments, dielectric grease can be added to the first connector 14 and the second connector to ensure the connection points are sealed. The enclosure 12 can be formed by such as, for example, stamping, bending and welding, being forged, injection molded or the like. The enclosure 12 can be watertight to keep the contents within the inner chamber 13 dry and away from the elements. The enclosure 12 further comprise stand offs or connection tabs (not shown) that can be integral within the enclosure or attached to the enclosure.

The remote light switch 10 can further comprise a cover 17 which can be attached to the enclosure 12 and can cover the opening on the at least one side by at least one fastener which can be such as, for example, bolts, adhesive, rivets, or the like. In other embodiments, the remote light switch 10 can be manufactured into or integral to the trailer during manufacturing and can be integrated within the trailer, or any part of the trailer such as its frame, tongue, or within the trailer enclosure itself.

In embodiments, the enclosure 12 can further comprise at least one trailer attachment hole 22 wherein a first trailer attachment 30 can be removably or permanently attached to a second trailer attachment 32. The second trailer attachment 32 can be removably or permanently attached to a trailer frame 52 wherein the second trailer attachment can have two vertical walls 24 and a top wall 33 that can enclose the trailer frame on at least three sides. The second trailer attachment 32 can further comprise at least one hole wherein at least one bolt 36 and nut 38 can clamp the trailer attachment down onto the trailer frame 52. In certain embodiments the enclosure 12 can be directly attached to the trailer frame 52 or the first trailer attachment 30 can be attached directly to the trailer frame. In other embodiments, the first trailer attachment 30 can have a slide and groove wherein the first trailer attachment can slide into the second trailer attachment's groove and can be locked into place by a fastener or locking pin. In certain embodiments the enclosure 12 can be attached to the trailer frame 52 or trailer jack by such as, for example, weld, ziptie, clamp, fastener, adhesive, or the like.

The connector, first connector 14 and the second connector 16, can be such as, for example, 7-pin round blade, 6-pin round, flat 5-pin, flat 4-pin, flat 3-pin, any standard trailer connector, or the like. The first connector 14 and second connector 16 can be connected to an electrical system 18 comprising a wireless module 21, a switch 23 and the controller 25 and can be attached to the enclosure by at least one fastener to stand offs or connection tabs. The controller can be such as, for example, micro-controller ("MCU"), programmable logic control ("PLC"), Proportional-Integral-Derivative (PID) controllers, or the like. The first connector 14 and second connector 16 can be connected to an electrical system 18 by a wired connection 27 by such as, for example, a ribbon cable, serial cable, micro-connector, solder directly to the board, or the like.

In certain embodiments, the electrical system 18 can be a custom printed circuit board that comprises a wireless module, switch and micro-controller ("MCU") or it can be an off the shelf system such as a wireless remote with infrared or radio frequency ("RF"), switch and the controller 25 that can be integral to or separate from the controller. In embodiments, the wireless module 21 can be such as, for example, Wi-Fi, Bluetooth, RF transceiver and processor, or the like. The wireless module 21 can receive and send signals 72 to the user's remote 70. The switch 23 can be such as, for example, wireless switch, electrical switch or the like and in certain embodiments there can be an additional mechanical switch that can be attached to the enclosure or trailer 60 for the user to activate the lights directly from the enclosure and mechanical switch. The user can remotely activate the switch 23 allowing the power source 50 to activate the trailer's lights 58 on the trailer 60 wirelessly. In certain embodiments the wireless module 21 can additionally be connected wireless to wireless lighting through such as, for example, Bluetooth, Bluetooth Low Energy, Wi-Fi, Zigbee, or the like. The wireless module 21 can be a combination of Wi-Fi, Bluetooth, RF transceiver and processor, Bluetooth Low Energy or the like to be able to communicate with the remote and the wireless lights.

In embodiments, the remote light switch 10 can further comprise an antenna 16 attached to the enclosure 12 and connected to the electrical system 18. The antenna 16 can be such as, for example, a flexible antenna, telescopic antenna, embedded antenna, loop antenna, or the like. The antenna 16 can extend out of the enclosure 12 or it can be embedded within the enclosure. In certain embodiments the antenna 16 can be omitted and integrated within the electrical system 18, or the antenna can be integrated or embedded into the enclosure or the trailer. The controller 25 can control the switch and wireless module wherein the when the wireless module receives a signal from a wireless remote the controller can activate the switch or deactivate the switch.

In other embodiments, the electrical system 18 can further comprise a temperature sensor, pressure sensor, humidity sensor, voltage regulator or the like wherein the user is able to read the date sent to the remote 70. The controller 25 can be connected to a motion detector (not shown) that is attached to the enclosure 12.

In embodiments, the remote light switch 10 can be attached to a trailer 60 wherein a trailer can be such as, for example, recreational vehicle, travel trailer, fifth wheel trailer, pop-up trailer, toy hauler, flatbed trailer, enclosed trailer, car hauler, or the like. The trailer's connector 56 can be attached to the remote light switch 10 by either the first connector and the second connector or both. The trailer's connector 56 can be attached to at least one power source 50 on the trailer wherein the power source can power the remote light switch 10 wherein the power source can be such as, for example, flooded lead acid battery, silver calcium battery, gel cell battery rechargeable battery, solar panels, or the like.

In other embodiments the remote light switch 10 can have its own power source 50 or can be connected directly to the trailer's power source such as, for example, alkaline, nickel metal hydride, lithium ion, or the like and can power the electrical system 18 and the trailer's lights 58. The trailer's connector 56 can be connected to the trailer's lights 58 such as, for example, its running lights, turning lights, brake lights, or the like wherein when a remote 70 sends a signal to the remote light switch 10 to turn on or turn off the lights, the switch 23 activates or deactivates to allow power from the power source 50 to turn the lights on or off. In certain embodiments, the remote 70 and/or controller can control for example, the intensity of the lights, color of the lights, lights blinking, or the like. In certain embodiments a motion sensor can be coupled to the remote light switch wherein when something passes the motion sensor the lights can be activated wherein the user can set such as, for example, the duration of the lights being on, intensity of the lights, motion sensitivity, or the like.

In embodiments, the remote light switch 10 can send a signal back to the remote to let the user know what the status is of the lights such as, for example, whether the lights are on or off, whether the motion sensor has been activated, the status of the power source or the like. The remote light switch 10 can send and receive a signal from a user's remote up to at least 5 miles, but in the preferred embodiment up to a half mile. In the preferred embodiment the remote can be at least one button push remote that can send a signal to the remote light switch 10 to turn on and off the lights, set the intensity, the duration, or the like.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

What is claimed is:

1. A remote light switch for selectively operating light features on a mobile structure having a power source and a light harness that has at least one electrical connection for at least one light on the mobile structure, the switch comprising:
   a power harness to connect to the power source;
   an enclosure having at least one open side wherein a first side has at least one hole sized to fit the light harness;
   a connector in the enclosure that engages the light harness to allow selective electrical flow from the power source to the at least one electrical connection;
   a control in the enclosure comprising a wireless module, a switch and a controller wherein the controller allows a user to selectively activate the at least one electrical connection;
   an antenna attached to the enclosure and connected to the control.

2. The remote light switch according to claim 1, further comprising a cover that selectively covers the hole.

3. The remote light switch according to claim 1, wherein the connector is at least one of a 7-pin, 3-pin or 4-pin female socket for a trailer or a recreational vehicle.

4. The remote light switch according to claim 1, wherein wireless module is wirelessly coupled to a remote control.

5. The remote light switch according to claim 4, wherein the remote is a wireless remote, smart phone, tablet or laptop.

6. The remote light switch according to claim 1, wherein the enclosure further comprises a first trailer attachment that is attached to the enclosure wherein the trailer attachment is removably attached to a second trailer attachment.

7. The remote light switch according to claim 5, wherein the second trailer attachment is a clamp to be clamped around a trailer frame.

8. The remote light switch according to claim 1, wherein the wireless model is an infrared signal, radio frequency signal or Wi-Fi signal.

9. The remote light switch according to claim 1, wherein the controller is a micro-controller.

10. The remote light switch according to claim 1, wherein the antenna is a flexible, telescopic or integrated within the enclosure.

11. The remote light switch according to claim 1, wherein the connector is a first connector and a second connector.

12. The remote light switch according to claim 1, wherein the mobile structure is a recreational vehicle, fifth wheel, camper trailer, or flatbed trailer.

13. The remote light switch according to claim 1, wherein the power source is a battery on the trailer or a power source in the enclosure wherein the power source is a flooded lead acid battery, lithium-ion battery, silver calcium battery, gel cell battery or nickel metal hydride.

14. The remote light switch according to claim 1, wherein the at least one light is at least one of trailer lights, led lights, rope lighting, wire rope lighting, or lantern lighting.

15. The remote light switch according to claim 9, wherein the user can selectively choose between the intensity of the lights, color of the lights, lights blinking/flashing, light on or off through the remote and the controller.

* * * * *